United States Patent
Kase

(10) Patent No.: US 8,362,155 B2
(45) Date of Patent: Jan. 29, 2013

(54) CONJUGATED DIENE POLYMER CYCLIZED PRODUCT AND METHOD FOR PRODUCING THE SAME

(75) Inventor: Toshio Kase, Tokyo (JP)

(73) Assignee: Zeon Corporation, Tokyo (JP)

( * ) Notice: Subject to any disclaimer, the term of this patent is extended or adjusted under 35 U.S.C. 154(b) by 416 days.

(21) Appl. No.: 11/630,668

(22) PCT Filed: Jun. 13, 2005

(86) PCT No.: PCT/JP2005/010774
§ 371 (c)(1),
(2), (4) Date: Dec. 26, 2006

(87) PCT Pub. No.: WO2006/001185
PCT Pub. Date: Jan. 5, 2006

(65) Prior Publication Data
US 2009/0171033 A1    Jul. 2, 2009

(30) Foreign Application Priority Data
Jun. 25, 2004   (JP) ................................. 2004-187887

(51) Int. Cl.
*C08F 136/08* (2006.01)
(52) U.S. Cl. ............... 525/333.1; 525/331.9; 525/333.2; 525/332.6; 525/353; 525/383; 526/335; 526/340.1; 526/82; 526/84
(58) Field of Classification Search ............... 525/331.9, 525/333.1, 333.2, 332.6, 353, 383; 526/335, 526/340.1, 82, 84
See application file for complete search history.

(56) References Cited

U.S. PATENT DOCUMENTS

| | | | | |
|---|---|---|---|---|
| 2,484,614 | A | * | 10/1949 | D Ianni ........................ 528/492 |
| 4,248,986 | A | * | 2/1981 | Lal et al. ........................ 525/99 |
| 4,415,695 | A | * | 11/1983 | Sarkar ............................ 524/405 |
| 4,508,877 | A | * | 4/1985 | Todoko et al. ............... 525/333.1 |
| 4,678,841 | A | * | 7/1987 | Yoshizawa et al. ............ 525/353 |
| 5,043,395 | A | * | 8/1991 | Oshima et al. .............. 525/332.8 |
| 5,516,835 | A | | 5/1996 | Ishiguro et al. |
| 7,279,533 | B2 | * | 10/2007 | Kitahara et al. ............ 525/333.1 |
| 2005/0154156 | A1 | * | 7/2005 | Karato et al. ................... 526/82 |
| 2006/0063890 | A1 | * | 3/2006 | Kitahara et al. ............... 525/191 |

FOREIGN PATENT DOCUMENTS

| | | |
|---|---|---|
| EP | 0110356 A1 | 6/1984 |
| JP | 48-38393 A | 6/1973 |
| JP | 57-70102 A | 4/1982 |
| JP | 59-96112 A | 6/1984 |
| JP | 60-71616 A | 4/1985 |
| JP | 61-26602 A | 2/1986 |
| JP | 61-163904 A | 7/1986 |
| JP | 6-157682 A | 6/1994 |
| JP | 09-235316 * | 9/1997 |
| JP | 9-316116 A | 12/1997 |
| JP | 2001-48920 A | 2/2001 |
| JP | 2003-268041 A | 9/2003 |
| WO | WO 03/033255 A1 | 4/2003 |
| WO | 03/078482 * | 9/2003 |
| WO | 2004/065427 * | 8/2004 |

OTHER PUBLICATIONS

European Search Report for Application No. 05748979.1 dated Jul. 13, 2010.
Korean Office Action for Application No. 10-2006-7026185 dated Nov. 11, 2011.
English Translation of Korean Office Action for Korean Patent Application No. 10-2006-7026185 dated Nov. 11, 2011.

* cited by examiner

*Primary Examiner* — Robert C Boyle
(74) *Attorney, Agent, or Firm* — Birch, Stewart, Kolasch & Birch, LLP

(57) ABSTRACT

[Problem] To provide a conjugated diene polymer cyclized product free from coloring, a conjugated diene polymer cyclized product that has a narrow molecular weight distribution and is free from coloring, and a method for producing these conjugated diene polymer cyclized products.
[Means for Resolution] A conjugated diene polymer cyclized product having a Gardner color scale of not more than 3.0. A conjugated diene polymer cyclized product having a Gardner color scale of not more than 3.0 and a ratio of weight average molecular weight/number average molecular weight of not more than 1.5. A method for producing a conjugated diene polymer cyclized product includes adding water to a conjugated diene polymer solution obtained by polymerizing a conjugated diene in a solvent by using an organoalkali metal compound as an initiator, thereby terminating the polymerization and then subjecting the subject conjugated diene polymer to a cyclization reaction.

3 Claims, No Drawings

CONJUGATED DIENE POLYMER CYCLIZED PRODUCT AND METHOD FOR PRODUCING THE SAME

TECHNICAL FIELD

The present invention relates to a conjugated diene polymer cyclized product and to a method for producing the same. In more detail, the invention relates to a conjugated diene polymer cyclized product which is free from coloring, to a conjugated diene polymer cyclized product which is free from coloring and has a narrow molecular weight distribution, namely a small ratio of a weight average molecular weight to a number average molecular weight ((weight average molecular weight)/(number average molecular weight)), and to a method for producing the same.

BACKGROUND ART

Conjugated diene polymer cyclized products obtained by introducing a ring structure into a conjugated diene polymer rubber such as natural rubbers and synthetic polyisoprene rubbers have been employed as a photoresist material. A conjugated diene polymer cyclized product used for this application is required of a low metal content, an adequate molecular weight and a narrow molecular weight distribution.

In order to meet such requirements, Patent Document 1 discloses a method for producing a high-purity diene polymer cyclized product, which is characterized by polymerizing a diene monomer by using an organometal compound represented by the general formula: RM (wherein R represents an alkyl group, an aryl group, or the like; and M represents an element of the Group I of the periodic table), subsequently cyclizing the polymer by a specific fluorine-containing substituted sulfonic acid compound, and then washing the reaction liquid with water. According to this method, it is described that the cyclization reaction can be achieved with high activity without generating a gel and that a high-purity diene polymer cyclized product having a very low metal ion content can be obtained in a good yield without complicated post-treatments.

Patent Document 2 discloses that an isoprene polymer cyclized product having a degree of dispersion ((weight average molecular weight)/(number average molecular weight)) of not more than 2 is obtained by polymerizing an isoprene monomer in the presence of an organometal represented by the general formula: RM (wherein R represents an alkyl, aryl or aralkyl group; and M represents lithium, sodium or potassium) and cyclizing this polymer by a catalyst composed of a boron trifluoride ether complex and a specific carboxylic acid.

Patent Document 3 discloses a method for producing a conjugated diene polymer cyclized product by adding a phenolic compound to a conjugated diene polymer solution, obtained by using an organolithium compound, and making a Lewis acid and a Broensted acid act in this conjugated diene polymer solution. According to this method, it is described that by suppressing broadening of the molecular weight distribution of the conjugated diene polymer cyclized product, a cyclized product having a molecular weight distribution of less than 2, and preferably not more than 1.5 is obtainable.
Patent Document 1: JP-A-57-070102
Patent Document 2: JP-A-59-096112
Patent Document 3: JP-A-61-163904

Now, in recent years, it has been found that conjugated diene polymer cyclic products are not only excellent in chemical resistance, heat resistance and weather resistance but also excellent in adhesion properties to non-polar polymers such as polyolefins; polar polymers such as polyesters, polyurethanes, and alkyd resins; metals such as iron; and so on. For that reason, the conjugated diene polymer cyclized products have been being applied for various applications including paints, adhesives, electric or electronic materials, vehicles for printing inks, and optical materials, besides applications related to resists for which they have hitherto been praisefully used.

A conjugated diene polymer cyclized product which is used for these applications, especially applications such as electronic materials, vehicles for printing inks, primers for paints, optical materials, and resists is required to be free from coloring in addition to the narrow molecular weight distribution.

The present inventor studied the methods as described in the above-mentioned respective patent documents, and have understood that, aside from the molecular weight distribution, coloring of the resulting polymer is so considerable that the polymer does not reach levels required for the above-mentioned applications at all.

DISCLOSURE OF THE INVENTION

Problems that the Invention is to Solve

Accordingly, an object of the invention is to provide a conjugated diene polymer cyclized product that can be suitably used for the above-mentioned respective applications and is free from coloring. Other object of the invention is to provide a conjugated diene polymer cyclized product free from coloring and has a narrow molecular weight distribution, namely a small ratio of a weight average molecular weight to a number average molecular weight ((weight average molecular weight)/(number average molecular weight)). A still other object of the invention is to provide a method for producing the above-mentioned conjugated diene polymer cyclized products.

Means for Solving the Problems

The present inventor made extensive investigations with respect to the polymerization reaction and cyclization reaction of a conjugated diene, and has found that the above-mentioned problems can be solved by adding water to a conjugated diene polymer solution obtained by using an organolithium, thereby terminating a polymerization reaction, and then subjecting the resulting conjugated diene polymer to a cyclization reaction. The invention is accomplished on the basis of this knowledge.

Thus, according to the invention, a conjugated diene polymer cyclized product having a Gardner color scale of not more than 3.0 is provided. Also, according to the invention, a conjugated diene polymer cyclized product having a Gardner color scale of not more than 3.0 and a ratio of a weight average molecular weight to a number average molecular weight ((weight average molecular weight)/(number average molecular weight)) of not more than 1.5 is provided.

In addition, according to the invention, a method for producing the above-mentioned conjugated diene polymer cyclized product, which is characterized by adding water to a conjugated diene polymer solution obtained by polymerizing a conjugated diene in a solvent by using an organoalkali metal compound as an initiator, thereby terminating the polymerization, and then subjecting the resulting conjugated diene polymer to a cyclization reaction is provided.

The method for producing a conjugated diene polymer cyclized product of the invention is preferably carried out by adding water to a conjugated diene polymer solution obtained by polymerizing a conjugated diene in a solvent by using an organoalkali metal compound as an initiator, thereby terminating the polymerization, and then subjecting the conjugated diene polymer to a cyclization reaction in the conjugated diene polymer solution.

Advantages of the Invention

According to the invention, a conjugated diene polymer cyclized product which is free from coloring is provided; and a conjugated diene polymer cyclized product which is free from coloring and has a narrow molecular weight distribution, namely a small ratio of a weight average molecular weight to a number average molecular weight ((weight average molecular weight)/(number average molecular weight)) is also provided. The conjugated diene polymer cyclized product of the invention is useful for not only applications related to resists but also various applications such as paints, adhesives, electric or electronic materials, vehicles for printing inks, and optical materials.

BEST MODES FOR CARRYING OUT THE INVENTION

The conjugated diene polymer cyclized product is obtained by subjecting a conjugated diene polymer to a cyclization reaction.

It is presumed that the conjugated diene polymer cyclized product has a 6-membered ring structure formed by cyclization of a conjugated diene polymer within the molecule. The 6-membered rings may be independently present, or have a structure formed by condensation with each other.

As the conjugated diene polymer, homopolymers and copolymers of a conjugated diene monomer and copolymers of a conjugated diene monomer and a monomer copolymerizable therewith can be used. The copolymer may be any of a random copolymer or a block copolymer.

The conjugated diene monomer is not particularly limited, and specific examples thereof include 1,3-butadiene, isoprene, 2,3-dimethyl-1,3-butadiene, 2-phenyl-1,3-butadiene, 1,3-pentadiene, 2-methyl-1,3-pentadiene, 1,3-hexadiene, 4,5-diethyl-1,3-octadiene, 3-butyl-1,3-octadiene and the like.

These monomers may be used singly or in combination of two or more kinds thereof.

Of these conjugated diene monomers, 1,3-butadiene and isoprene are preferable; and isoprene is especially preferable.

Examples of the monomer copolymerizable with the conjugated diene monomer include aromatic vinyl monomers such as styrene, o-methylstyrene, p-methylstyrene, m-methylstyrene, 2,4-dimethylstyrene, ethylstyrene, p-t-butylstyrene, α-methylstyrene, α-methyl-p-methylstyrene, o-chlorostyrene, m-chlorostyrene, p-chlorostyrene, p-bromostyrene, 2,4-dibromostyrene, and vinylnaphthalene; linear olefin monomers such as ethylene, propylene, and 1-butene; cyclic olefin monomers such as cyclopentene and 2-norbornene; non-conjugated diene monomers such as 1,5-hexadiene, 1,6-heptadiene, 1,7-octadiene, dicyclopentadiene, and 5-ethylidene-2-norbornene; (meth)acrylic esters such as methyl(meth)acrylate and ethyl(meth)acrylate; other (meth)acrylic acid derivatives such as (meth)acrylonitrile and (meth)acrylamide; and the like.

These monomers may be used singly or in combination of two or more kinds thereof.

Specific examples of such a conjugated diene polymer include a natural rubber (NR), a styrene-butadiene rubber (SBR), a styrene-isoprene rubber (SIR), a polyisoprene rubber (IR), a polybutadiene rubber (BR), a styrene-isoprene block copolymer, a styrene-butadiene block copolymer, an isoprene-isobutylene copolymer rubber (IIR), an ethylene-propylene-diene copolymer rubber (EPDM), a butadiene-isoprene copolymer rubber (BIR) and the like. Of these, a polyisoprene rubber and a polybutadiene rubber are preferable; and a polyisoprene rubber is more preferable.

Though the content of a conjugated diene monomer unit in the conjugated diene polymer is properly chosen within the range where the effects of the invention are not hindered, it is usually 40% by mole or more, preferably 60% by mole or more, and more preferably 80% by mole or more. When the content of the conjugated diene monomer unit is too small, there is a risk that it becomes difficult to obtain a rate of cyclization within an appropriate range.

In the conjugated diene polymer cyclized product of the invention, its weight average molecular weight is usually from 1,000 to 1,000,000, preferably from 10,000 to 700,000, and more preferably from 30,000 to 500,000 in terms of standard polystyrene as measured by gel permeation chromatography. When the weight average molecular weight is too low, there are tendencies such that the conjugated diene polymer cyclized product is difficult to be handled as a powder, that it is difficult to be formed into a film and that its mechanical strength is lowered. A too high molecular weight may increase the solution viscosity to cause troubles when the conjugated diene polymer cyclized product is used for coating or spray painting, and may lower the workability when the conjugated diene polymer cyclized product is extrusion molded.

Furthermore, a molecular weight distribution of the conjugated diene polymer cyclized product, namely a ratio of a weight average molecular weight to a number average molecular weight ((weight average molecular weight (Mw))/(number average molecular weight (Mn))) is preferably not more than 1.5, more preferably not more than 1.4, and especially preferably not more than 1.3.

A rate of cyclization of the conjugated diene polymer cyclized product of the invention is 10% or more, preferably from 60 to 95%, and more preferably from 70 to 85%. The rate of cyclization of the conjugated diene polymer cyclized product falling within the range of from 60 to 95% permits the exhibition of remarkable effects, when the conjugated diene polymer cyclized product is used for adhesion between a non-polar polymer and a polar polymer.

The rate of cyclization of the conjugated diene polymer cyclized product as referred to herein means a value obtained by the method as described in the following document (i) or (ii).

(i) M. A. Golub and J. Heller, Can. J. Chem., Vol. 41, 937 (1963)

(ii) Y. Tanaka and H. Sato, J. Polym. Sci: Poly. Chem. Ed., Vol. 17, 3027 (1979)

A degree of the cyclization of the conjugated diene polymer cyclized product of the invention can be expressed by a rate of reduction of unsaturated bonds. The rate of reduction of unsaturated bonds is an index to express a degree of reduction of an unsaturated bond in a conjugated diene monomer unit segment in the conjugated diene polymer due to the cyclization reaction and is a numerical value obtained in the following manner. That is, a ratio of a peak area of a proton directly bound to a double bond to a peak area of all protons in the conjugated diene monomer unit segment in the conjugated diene polymer is determined before and after the cyclization reaction by means of the proton NMR analysis, from which is then calculated its rate of reduction.

In the conjugated diene monomer unit segment in the conjugated diene polymer, a peak area of all protons and a peak area of protons directly bound to a double bond before the cyclization reaction are defined as SBT and SBU, respectively, while a peak area of all protons and a peak area of protons directly bound to a double bond after the cyclization reaction are defined as SAT and SAU, respectively, then, a ratio of a peak area (SB) of the proton directly bound to the double bond before the cyclization reaction is [SB=SBU/SBT]; and a ratio of a peak area (SA) of the protons directly bound to the double bond after the cyclization reaction is [SA=SAU/SAT].

Accordingly, the rate of reduction of unsaturated bonds is determined according to the following equation.

[Rate of reduction of unsaturated bonds (%)]=100×($SB-SA$)/$SB$

The conjugated diene polymer cyclized product of the invention preferably has a rate of reduction of unsaturated bonds of 10% or more. The rate of reduction of unsaturated bonds is more preferably from 40 to 75%, and further preferably from 45 to 65%. The rate of reduction of unsaturated bonds of the conjugated diene polymer cyclized product can be adjusted by properly choosing the amount of an acid catalyst, the reaction temperature, the reaction time, and so on in the cyclization reaction.

The rate of reduction of unsaturated bonds of the conjugated diene polymer cyclized product falling within the above-mentioned range permits exhibition of remarkable effects, when the conjugated diene polymer cyclized product of the invention is used for adhesion between a non-polar polymer and a polar polymer.

Though a degree of cyclization (n) of the conjugated diene polymer cyclized product, namely an average condensation degree of rings generated upon cyclization of the conjugated diene polymer is not particularly limited, it is preferably in the range of n=1 to 3.

A glass transition temperature (Tg) of the conjugated diene polymer cyclized product of the invention is not particularly limited but can be properly chosen depending upon the application. It is usually in the range of from 0 to 120° C., preferably from 30 to 90° C., and more preferably from 40 to 80° C. When Tg of the conjugated diene polymer cyclized product falls outside such a range, there is a risk that a problem is generated in handling properties.

Tg of the conjugated diene polymer cyclized product can be adjusted by properly choosing the composition or the rate of cyclization of the conjugated diene polymer to be cyclized.

The hue of the conjugated diene polymer cyclized product can be expressed by a Gardner color scale and is measured according to JIS K-5600-2-1. The Gardner color scale of the conjugated diene polymer cyclized product of the invention is not more than 3.0, preferably not more than 2.0, and more preferably not more than 1.0.

The amount of a gel (a proportion of toluene-insoluble matters) of the conjugated diene polymer cyclized product of the invention is usually not more than 10% by weight, and preferably not more than 5% by weight. It is especially preferable that the conjugated diene polymer cyclized product substantially contains no gel. When the amount of the gel is large, the workability in extrusion molding may be lowered to make it difficult to form the conjugated diene polymer cyclized product into a smooth film or to make it difficult to prepare a uniform solution.

The conjugated diene polymer cyclized product of the invention has such an advantage that a gel is not generated even in long-term storage.

Though the shape of the conjugated diene polymer cyclized product of the invention is not particularly limited but can be properly chosen depending upon the application, it is usually in a pellet or powdered form. In order to make the conjugated diene polymer cyclized product in a powdered form, the conjugated diene polymer cyclized product in a solid form may be pulverized under cooling by a pulverizer such as a bantam mill and a jet mill, and classified.

When the conjugated diene polymer cyclized product of the invention is used in a powdered form, its average particle size is usually from 1 to 200 μm, preferably from 3 to 100 μm, and more preferably from 5 to 50 μm. Here, the particle size of the powder is one obtained by a laser diffraction scattering method.

The conjugated diene polymer cyclized product of the invention can be obtained by adding water to a conjugated diene polymer solution obtained by polymerizing a conjugated diene in a solvent by using an organoalkali metal compound as an initiator, thereby terminating the polymerization, and then subjecting the conjugated diene polymer to a cyclization reaction.

The conjugated diene polymer used for the production of the conjugated diene polymer cyclized product of the invention can be obtained by anionic solution polymerization by using an organoalkali metal compound as an initiator.

The organoalkali metal compound is represented by the general formula: RM. Here, R represents an alkyl group, an optionally substituted aryl group, or an aralkyl group. As the alkyl group, an alkyl group having from 1 to 5 carbon atoms is preferable, and specific examples thereof include a methyl group, an ethyl group, an n-propyl group, an i-propyl group, an n-butyl group, a sec-butyl group, a t-butyl group, an i-butyl group, an amyl group, an i-amyl group and the like. Examples of the optionally substituted aryl group include a phenyl group, a tolyl group, a naphthyl group, a biphenyl group and the like, each of which may have a substituent. Furthermore, examples of the aralkyl group include a benzyl group and the like.

M represents an alkali metal; and lithium, sodium and potassium are preferable.

Specific examples of the organoalkali metal compound include butyllithium, sodium naphthalene, phenylisopropylpotassium, α-methylstyrene tetramer potassium and the like. Of these, butyllithium is preferable.

A solvent used for the polymerization is not particularly limited so far as it does not hinder the polymerization reaction. Specific examples thereof include aromatic hydrocarbons such as benzene, toluene, xylene, and ethylbenzene; aliphatic hydrocarbons such as n-butane, n-pentane, n-hexane, n-heptane, and n-octane; alicyclic hydrocarbons such as cyclopentane and cyclohexane; and the like.

The polymerization temperature, pressure and monomer concentration and other various conditions are not particularly limited.

In the method for producing a conjugated diene polymer cyclized product of the invention, water is added to a conjugated diene polymer solution obtained by the above-mentioned anionic solution polymerization, thereby terminating the polymerization.

The amount of water to be added is usually in the range of from 0.8 to 2.0, preferably from 0.9 to 1.5, and more preferably from 1.0 to 1.2 in terms of an equivalent ratio to the alkali in the organoalkali metal compound. When this equivalent ratio is too small, it becomes difficult to suppress broadening of the molecular weight distribution in the cyclization reaction causing it difficult to obtain a cyclized product having a narrow molecular weight distribution. Conversely, when the equivalent ratio is too large, the reaction rate in the cyclization reaction may be lowered to cause remarkable lowering in the rate of cyclization.

Furthermore, in order to obtain a conjugated diene polymer cyclized product having a narrow molecular weight distribution, it is preferable that the inside of a polymerization reaction system is deaerated.

Though the polymerization reaction using the organoalkali metal compound as an initiator can be usually terminated by a compound containing a hydroxy group or the like, including alcohols such as methanol and ethanol and phenolic compounds, it is essential in the invention to terminate the polymerization reaction by water. When a polymerization terminator other than water is used singly, coloring of the finally obtained conjugated diene polymer cyclized product becomes serious. Accordingly, though it is not impossible to use a polymerization terminator other than water jointly (with water), its use amount is not more than 10% by weight in terms of a ratio in the polymerization terminator.

Furthermore, the conjugated diene polymer cyclized product of the invention has such an advantage that even when stored at high temperatures in the air, the molecular weight distribution does no become broader.

Furthermore, in terminating the polymerization reaction by the addition of water, it is preferred to make a surfactant present in the polymerization reaction system. In this way, dispersion of water into the system is promoted to allow uniform termination of the polymerization.

In order to make a surfactant present in the polymerization reaction system, the surfactant may be added to the polymerization reaction system before the addition of water or simultaneously with the addition of water. However, it is simple to add the surfactant as an aqueous solution thereof.

The kind of the surfactant is not particularly limited, and all of an anionic surfactant, a nonionic surfactant, a cationic surfactant, and an ampholytic surfactant are useful.

The anionic surfactant is not particularly limited. Specific examples thereof include carboxylic acid salts such as fatty acid soaps and alkyl ether carboxylic acid salts; sulfonic acid salts such as alkylbenzenesulfonic acid salts, salts of a β-naphthalenesulfonic acid/formalin condensate, dialkylsulfosuccinic acid ester salts, and α-olefin sulfonic acid salts; sulfuric acid ester salts such as higher alcohol sulfuric acid ester salts, secondary higher alcohol sulfuric acid ester salts, alkyl ether sulfuric acid salts, and polyoxyethylene alkylphenyl ether sulfuric acid salts; phosphoric ester salts such as alkyl ether phosphoric ester salts and alkyl phosphoric ester salts; and the like.

The nonionic surfactant is not particularly limited. Specific examples thereof include ether type surfactant such as polyoxyethylene alkyl ethers, polyoxyethylene secondary alcohol ethers, polyoxyethylene lanolin derivatives, and polyoxyethylene/polyoxypropylene block polymers; ether ester type surfactant such as polyoxyethylene glycerin fatty acid esters, polyoxyethylene sorbitan fatty acid esters, and polyoxyethylene sorbitol fatty acid esters; ester type surfactant such as polyethylene glycol fatty acid esters, polyglycerin fatty acid esters, sorbitan fatty acid esters, propylene glycol fatty acid esters, and sucrose fatty acid esters; nitrogen-containing surfactant such as fatty acid alkanolamides, polyoxyethylene fatty acid amides, and polyoxyethylene alkylamines; and the like.

The cationic surfactant is not particularly limited. Specific examples thereof include aliphatic amine salts, aliphatic quaternary ammonium salts, benzalconium salts, and the like.

The ampholytic surfactant is not particularly limited. Specific examples thereof include carboxybetains, aminocarboxylic acid salts, lecithin and the like.

Though the amount of such a surfactant is not particularly limited, it is usually in the range of from 0.1 to 10 parts by weight based on 100 parts by weight of water used for the termination of the polymerization.

The resulting conjugated diene polymer is then subjected to a cyclization reaction.

The cyclization reaction is usually carried out by a treatment of the conjugated diene polymer with an acid catalyst.

The acid catalyst used for the cyclization reaction is not particularly limited. Specific examples thereof include sulfuric acid; organic sulfonic acid compounds such as fluoromethanesulfonic acid, difluoromethanesulfonic acid, p-toluenesulfonic acid, xylenesulfonic acid, alkylbenzenesulfonic acids containing an alkyl group having from 2 to 18 carbon atoms, and anhydrides or alkyl esters thereof; Lewis acids such as boron trifluoride, boron trichloride, tin tetrachloride, titanium tetrachloride, aluminum chloride, diethylaluminum monochloride, ethylaluminum dichloride, aluminum bromide, antimony pentachloride, tungsten hexachloride, and iron chloride and the like. These acid catalysts may be used singly or in combination of two or more kinds thereof. Of these, organic sulfonic acid esters are preferable, and p-toluenesulfonic acid and xylenesulfonic acid are more preferable in view of easiness of the removal of an acid catalyst residue in a filtration or water-washing step.

The use amount of the acid catalyst is usually from 0.05 to 10 parts by weight, preferably from 0.1 to 5 parts by weight, and more preferably from 0.3 to 2 parts by weight based on 100 parts by weight of the conjugated diene polymer.

It is preferable that the cyclization reaction of the conjugated diene polymer is carried out in a solution.

A solvent is not particularly limited so far as it does not hinder the cyclization reaction. Specific examples thereof include aromatic hydrocarbons such as benzene, toluene, xylene, and ethylbenzene; aliphatic hydrocarbons such as n-pentane, n-hexane, n-heptane, and n-octane; alicyclic hydrocarbons such as cyclopentane and cylohexane; and the like.

The use amount of the solvent in the cyclization reaction is usually in the range of from 5 to 60% by weight, and preferably from 20 to 40% by weight in terms of solid content of the conjugated diene polymer.

It is preferable in view of the quality and operations that after the termination of the polymerization of the conjugated diene, an acid catalyst for the cyclization reaction is added to the polymerization reaction solution without isolating the conjugated diene polymer, thereby carrying out the cyclization reaction.

As a matter of course, it is allowed to replace the solvent of the polymerization reaction solution by a separate solvent for the cyclization reaction or to add other solvent for the cyclization reaction to the polymerization reaction solution.

The cyclization reaction can be carried out under any pressure of elevated pressure, reduced pressure or atmospheric pressure. When the reaction is carried out in a dry gas stream, especially in an atmosphere of dry nitrogen or dry argon, side reactions caused by the moisture can be suppressed.

In the cyclization reaction, the reaction temperature and reaction time are not particularly limited. The reaction temperature is usually from 50 to 150° C., and preferably from 70 to 110° C.; and the reaction time is usually from 0.5 to 10 hours, and preferably from 2 to 6 hours.

In the cyclization reaction, after a prescribed rate of cyclization is reached, the acid catalyst is inactivated by a usual way followed by removal of the acid catalyst residue from the reaction liquid, and the hydrocarbon solvent is subsequently removed to give a conjugated diene polymer cyclized product in a solid form.

Though the method for inactivating the acid catalyst is not particularly limited, it is preferable that the acid catalyst is neutralized by the addition of an alkaline compound to the reaction liquid. By this treatment with the alkaline compound, the residue of the acid catalyst used for the cyclization reaction can be efficiently removed.

Though the alkaline compound is not particularly limited, an alkaline compound, which reacts with the acid catalyst used for the cyclization reaction to form a substance insoluble in the solvent of the cyclization reaction, is preferable. In this way, the removal of the catalyst residue from the reaction liquid by filtration becomes easy.

Specific examples of the alkaline compound include alkali metal (hydrogen)carbonates such as sodium carbonate, potassium carbonate, and sodium hydrogencarbonate; alkali metal hydroxides such as sodium hydroxide and potassium hydroxide; ammonium hydroxide; and the like. A suitable alkaline compound may be chosen among them depending upon the acid catalyst used for the cyclization reaction.

As the alkaline compound, water-soluble alkaline compounds are preferable; and those which can be added as an aqueous solution having a concentration of 10% by weight or more, and especially preferably 20% by weight or more at 25° C. are preferable. By adding the alkaline compound in an aqueous solution with a higher concentration, the filtration becomes easy.

Though the use amount of the alkaline compound may be properly chosen, it is usually from 1 to 2 equivalents, and preferably from 1.1 to 1.3 equivalents to the used acid catalyst. When the use amount is too small, the removal of the acid catalyst residue may become insufficient, whereas when it is too large, the alkaline compound may remain to cause a trouble for some fields of applications.

After neutralizing the acid catalyst used for the cyclization reaction with the alkaline compound, a neutralized product is removed from the reaction liquid. Though the neutralized product can be removed by washing the reaction liquid with water, it can be easily removed by filtration when the neutralized product is insoluble in the reaction liquid.

After removing the acid catalyst residue from the cyclization reaction liquid, the solvent is removed in a usual way followed by drying and a conjugated diene polymer cyclized product is obtained.

In the invention, the conjugated diene polymer cyclized product may be one containing a polar group.

The polar group is not particularly limited. Examples thereof include an acid anhydride group, a carboxy group, a hydroxy group, a thiol group, an ester group (alkoxycarbonyl group), an epoxy group, an amino group, an amide group, a cyano group, a silyl group, a halogen and the like. Of these, an acid anhydride group, a carboxy group, a hydroxy group, an ester group, an epoxy group, and an amino group are preferable, and an acid anhydride group, a carboxy group, and a hydroxy group are more preferable from the viewpoint of exhibiting an improving effect of adhesion properties.

The conjugated diene polymer cyclized product containing a polar group can be obtained by modifying the conjugated diene polymer cyclized product obtained by the above-mentioned method with a compound containing a polar group (hereinafter referred to as "polar group-containing compound"). According to this method, it is easy to control the rate of cyclization of the polar group-containing conjugated diene polymer cyclized product.

Though the use amount of the polar group-containing compound may be properly chosen, it is usually in the range of from 0.1 to 200 mmoles, preferably from 1 to 100 mmoles, and more preferably from 5 to 50 mmoles, in terms of a ratio of the introduced polar group, per 100 g of the modified conjugated diene polymer cyclized product.

The polar group-containing compound is not particularly limited, and the following specific examples can be enumerated.

Examples of a compound containing an acid anhydride group include maleic anhydride, itaconic anhydride, aconitic anhydride, and norbornene dicarboxylic acid anhydride. Of these, maleic anhydride is praisefully used in view of reactivity and economy.

Examples of a compound containing a carboxy group include acrylic acid and methacrylic acid.

Examples of a compound containing a hydroxy group include hydroxyalkyl esters of an unsaturated acid such as 2-hydroxyethyl(meth)acrylate and 2-hydroxypropyl (meth) acrylate; unsaturated acid amides containing a hydroxy group such as N-methylol (meth)acrylamide and N-(2-hydroxyethyl)(meth)acrylamide; polyalkylene glycol monoesters of an unsaturated acid such as polyethylene glycol mono(meth) acrylate, polypropylene glycol mono(meth)acrylate, and poly(ethylene glycol-propylene glycol)mono(meth)acrylate; polyhydric alcohol monoesters of an unsaturated acid such as glycerol mono(meth)acrylate; and the like. Of these, hydroxyalkyl esters of an unsaturated acid are preferable; and 2-hydroxyethyl acrylate and 2-hydroxyethyl methacrylate are especially preferable.

Examples of other ethylenically unsaturated compounds containing a polar group include (meth)acrylic acid and derivatives thereof such as methyl(meth)acrylate, ethyl (meth)acrylate, butyl(meth)acrylate, glycidyl (meth)acrylate, dimethylaminoethyl(meth)acrylate, dimethylaminopropyl (meth)acrylate, (meth) acrylamide, and (meth)acrylonitrile.

A method for introducing the polar group-containing compound into the conjugated diene polymer cyclized product is not particularly limited. When an ethylenically unsaturated compound is added, a known reaction generally called as an ene addition reaction or a graft reaction can be adopted. Such an addition reaction is carried out by a reaction of the conjugated diene polymer cyclized product with the polar group-containing compound in the optional presence of a radical initiator. Examples of the radical initiator include peroxides such as di-t-butyl peroxide, dicumyl peroxide, benzoyl peroxide, t-butyl peroxybenzoate, and methyl ethyl ketone peroxide; azo nitrites such as azobis(isobutyronitrile); and the like.

Though the addition reaction may be carried out in a solid phase state or in a solution state, it is preferably carried out in a solution state because it is easy to control the reaction. As a solvent to be used, for example, the same solvents as those for the above-mentioned cyclization reaction are enumerated.

Though the addition reaction can be carried out under any pressure of elevated pressure, reduced pressure or atmospheric pressure, the addition reaction is desirably carried out under an atmosphere of atmospheric pressure in view of simplicity of the operations. When the reaction is carried out in a dry gas stream, especially in an atmosphere of dry nitrogen or dry argon, side reactions caused by the moisture can be suppressed.

The temperature and the time for the addition reaction are not particularly limited. The reaction temperature is usually from 30 to 250° C., and preferably from 60 to 200° C.; and the reaction time is usually from 0.5 to 5 hours, and preferably from 1 to 3 hours.

The conjugated diene polymer cyclized product containing a polar group can also be obtained by cyclizing a conjugated diene polymer containing a polar group. The cyclization can be carried out according to the above-mentioned method.

The conjugated diene polymer containing a polar group can be obtained by (1) homopolymerization or copolymerization of a conjugated diene containing a polar group, (2) copolymerization of a conjugated diene containing a polar group with an optionally polar group-containing monomer copolymerizable therewith, or (3) copolymerization of a conjugated diene monomer not containing a polar group with a polar group-containing monomer copolymerizable therewith. Furthermore, the conjugated diene polymer containing a polar group can also be obtained by (4) introduction of a polar group into a conjugated diene polymer not containing a polar group. The copolymerization method or the introduction method of a polar group may be carried out according to a known method.

The kind and the amount of the polar group contained in the conjugated diene polymer cyclized product may be properly chosen depending upon the application.

To the conjugated diene polymer cyclized product of the invention, various compounding agents such as an antioxidant, a filler, a pigment, a dye, and a softening agent can be added as the need arises. The kind of the compounding agent may be chosen depending upon the purpose for compounding, and the use amount of the compounding agent can be properly chosen depending upon the purpose for compounding, the kind of the compounding agent, and so on.

Examples of the antioxidant include phenolic antioxidants such as 2,6-di-t-butylphenol and 2,6-di-t-butyl-4-(4,6-bis(octylthio)-1,3,5-triazin-2-ylamino)phenol; amine antioxidants such as phenyl-α-naphthylamine, diphenyl-p-phenylenediamine, and N-1,3-dimethylbutyl-N'-phenyl-p-phenylenediamine; phosphorous antioxidants such as tris(nonylphenyl) phosphite and the like. Of these, phenolic antioxidants are preferable; and 2,6-di-t-butylphenol and 2,6-di-t-butyl-4-(4, 6-bis(octylthio)-1,3,5-triazin-2-ylamino)phenol are especially preferable.

These antioxidants may be used singly or in combination with two or more kinds thereof.

The content of the antioxidant is preferably 300 ppm or more, more preferably from 1,000 to 5,000 ppm, and especially preferably from 1,500 to 3,000 ppm. A lower limit of the content of the antioxidant is preferably 10 ppm, and more preferably 20 ppm. The conjugated diene polymer cyclized product not containing an antioxidant suffers from deterioration in its workability in extrusion molding, so that it is difficult to form a smooth film, and its mechanical strength tends to be lowered.

Examples of the filler include calcium carbonate, calcium oxide, magnesium oxide, calcium hydroxide, magnesium hydroxide, aluminum hydroxide, magnesium carbonate, calcium silicate, barium sulfate, mica, silica, carbon black, talc, clay, zinc oxide, glass fibers, carbon fibers and the like.

Examples of the pigment include inorganic pigments such as titanium dioxide, red iron oxide, black iron oxide, cadmium yellow, and cobalt blue; organic pigments such as perylene pigments, anthraquinone pigments, quinacridone pigments, azo pigments, indigo pigments, and copper phthalocyanine pigments and the like.

The conjugated diene polymer cyclized product of the invention is useful for many applications where the characteristics of the conjugated diene polymer cyclized product are made the best use.

For example, the conjugated diene polymer cyclized product of the invention is used as a powder coating by making the best use of excellent adhesion to resins or metals with optional compounding with an antioxidant, a filler, a pigment, a dye, a softening agent, a wax, etc.

Furthermore, the conjugated diene polymer cyclized product of the invention is useful for improving the adhesion properties of various polymers including thermoplastic resins such as hydrocarbon resins, polyester resins, polyamide resins, polyimide resins, polyurethane resins, polyetherimide resins, polysulfone resins, polyethersulfone resins, polyetheretherketone resins, polycarbonate resins, polyvinyl butyrate resins, polyallylate resins, and fluorine resins; thermosetting resin such as phenol resins, cresol resins, urea resins, melamine resins, alkyd resins, furan resins, unsaturated polyester resins, epoxy resins, and urethane resins; vulcanized rubbers such as natural rubbers, polybutadiene rubbers, styrene-butadiene rubbers, and acrylonitrile-butadiene rubbers; elastomers such as olefin thermoplastic elastomers, styrene thermoplastic elastomers, polyester thermoplastic elastomers, and polyamide thermoplastic elastomers; and the like.

The conjugated diene polymer cyclized product of the invention is also useful as a modifier for a molding material for the purpose of improving the dispersibility among polymers or the dispersibility of a compounding agent such as a filler and a pigment into the polymer. The conjugated diene polymer cyclized product of the invention exhibits an excellent modification effect, when incorporated with a hydrocarbon thermoplastic resin including linear olefin resins such as polyethylene, polypropylene, and polypentene-1; cyclic olefin resins such as addition copolymers of ethylene and a norbornene and a hydrogenated ring-opening polymer of norbornene; or the like. Though the compounding amount of the conjugated diene polymer cyclized product as the modifier is properly chosen depending upon the kind of a polymer as a substrate and the required performance, it is usually from 0.5 to 10 parts by weight, and preferably from 2 to 5 parts by weight based on 100 parts by weight of the substrate polymer.

In addition, the conjugated diene polymer cyclized product of the invention can be used as a primer used for the treatment of the substrate surface with optional compounding with other binder components or vehicle components and various additives. In this way, an effect for improving the adhesion properties can be obtained. Examples of other vehicle components include acrylic resins, urethane resins, ester resins, epoxy resins, melamine resins, alkyd resins, chlorinated olefin resins, silicone rubbers and the like.

On compounding with other vehicle components, the ratio is properly chosen depending upon the kind thereof or the purpose for compounding, it is usually from 100/0 to 5/95, preferably from 80/20 to 30/70, and more preferably from 70/30 to 50/50 in terms of a weight ratio of the conjugated diene polymer cyclized product to other vehicle components.

In the preparation of a primer, a conjugated diene polymer cyclized product or a mixture of a conjugated diene polymer cyclized product with other vehicle components is dissolved or dispersed in a solvent. The solvent which is used may be properly chosen, and examples thereof include aliphatic hydrocarbon solvents, alicyclic hydrocarbon solvents, aromatic hydrocarbon solvents, ketone solvents, alcohol solvents, ether solvents, halogen solvents, aqueous solvents and the like. The use amount of the solvent is usually in the range of from 5 to 95% by weight, and preferably from 15 to 60% by weight in terms of the solid content of the primer.

In addition, the conjugated diene polymer cyclized product of the invention can be used as a surface-treating agent for a filler, a pigment or the like. Thus, the dispersibility of a filler, a pigment, etc. in various polymers can be improved. Though the use amount of the conjugated diene polymer cyclized product is properly chosen depending upon the kind of a material to be treated or the purpose for the treatment, it is usually from 0.1 to 100 parts by weight, and preferably from 5 to 20 parts by weight based on 100 parts by weight of the material to be treated.

EXAMPLES

The invention will be more specifically described below with reference to the following Examples. Incidentally, parts and percentages in each of the Examples are on a mass basis unless specifically indicated.

Incidentally, respective characteristics were evaluated in the following methods.

[Average Molecular Weights (Mw and Mn) and Molecular Weight Distribution (Mw/Mn) of Conjugated Diene Polymer Cyclized Product]

A weight average molecular weight (Mw) and a number average molecular weight (Mn) are determined in terms of standard polystyrene by means of the gel permeation chromatographic analysis, from which is then determined a molecular weight distribution (Mw/Mn).

[Rate of Cyclization of Conjugated Diene Polymer Cyclized Product]

The rate of cyclization of the conjugated diene polymer cyclized product is determined by means of the proton NMR measurement according to a method as described in the following document (i) or (ii).

(i) M. A. Golub and J. Heller, Can. J. Chem., Vol. 41, 937 (1963)

(ii) Y. Tanaka and H. Sato, J. Polym. Sci: Poly. Chem. Ed., Vol. 17, 3027 (1979)

[Rate of Reduction of Unsaturated Bonds of Conjugated Diene Polymer Cyclized Product]

The rate of reduction of the unsaturated bonds of a conjugated diene polymer cyclized product is determined by means of the proton NMR measurement while referring to a method as described in the above-mentioned document (i) or (ii).

In the conjugated diene monomer unit segment in the conjugated diene polymer, a peak area of all protons and a peak area of protons directly bound to a double bond before the cyclization reaction are defined as SBT and SBU, respectively, while a peak area of all protons and a peak area of protons directly bound to a double bond after the cyclization reaction are defined as SAT and SAU, respectively, then, a ratio of a peak area (SB) of the protons directly bound to the double bond before the cyclization reaction is [SB=SBU/SBT]; and a ratio of a peak area (SA) of the proton directly bound to the double bond after the cyclization reaction is [SA=SAU/SAT].

Accordingly, the rate of reduction of unsaturated bonds is determined according to the following equation.

$$[\text{Rate of reduction of unsaturated bonds (\%)}] = 100 \times (SB - SA)/SB$$

[Hue and Color Tone of Conjugated Diene Polymer Cyclized Product]

The hue of the conjugated diene polymer cyclized product is measured with respect to a 25% toluene solution by using a Gardner calorimeter according to the Gardner method of JIS K5600-2-1 and expressed in terms of a Gardner color scale. Furthermore, the color tone is visually judged.

[Gel Amount]

1 g of a sample polymer is dissolved in 100 g of toluene; this solution is filtered through a polytetrafluoroethylene-made filter having a pore size of 1µ; a residue is dried and weighed; and a percentage of this weight of the residue to the weight of the sample polymer is then determined.

Example 1

A polymerization reaction was carried out under an elevated pressure of dry nitrogen in a stirrer-installed pressure-resistant autoclave having an internal volume of 18 liters and being temperature-controllable by a jacket. Cyclohexane as a polymerization solvent and an isoprene monomer were used after dehydration and deaeration in advance upon bubbling with nitrogen on a molecular sieve. 7,000 g of cyclohexane and 28.7 mmoles of n-BuLi (used as a hexane solution of 1.56 moles/L) were charged in a reactor, and the internal temperature was kept at 60° C. 3,000 g of isoprene was added in the reactor over 60 minutes by using a plunger pump, and stirring was further continued at 70° C. for 60 minutes. Thereafter, 29.4 mmoles of water was added as an aqueous solution having 1.0% of a special polycarboxylic acid polymer surfactant (a trade name "DEMOL EP", manufactured by Kao Corporation) dissolved therein was added after deaeration; thereby the polymerization reaction is terminated.

A part (398 g) of the polymer solution as obtained above was transferred into a separable flask having an internal volume of 1 liter under dry nitrogen through a flexible tube and then provided for the following cyclization reaction. That is, 16.8 g of a 5% solution of p-toluenesulfonic acid in toluene was added, and the mixture was stirred at 80° C. for 4 hours. Thereafter, 1.28 g of a 25% aqueous solution of sodium carbonate was added, and the mixture was stirred for 30 minutes to terminate the cyclization reaction.

After dehydration under reflux, the reaction mixture was filtered under an elevated pressure by using a nitrocellulose filter having a pore size of 1 µm in the presence of RADIOR-ITE to give a purified cyclized polyisoprene solution. This solution was cast on an aluminum dish and then dried in vacuo at 75° C. for 5 hours to give a film having a thickness of about 100 µm.

Analysis results of the polyisoprene, the cyclized polyisoprene immediately after the cyclization reaction and the cyclized polyisoprene film after drying in vacuo are shown in Table 1. There was obtained a colorless transparent film free from any change in the molecular weight distribution before and after drying in vacuo.

TABLE 1

| Polymerization terminator | | Example 1 Water | Comparative Example 1 Methanol | Comparative Example 2 BHT (*) |
|---|---|---|---|---|
| Polyisoprene | Mw (×10⁴) | 16.4 | 16.6 | 16.1 |
| | Mw/Mn | 1.08 | 1.08 | 1.08 |
| Cyclized polyisoprene (immediately after cyclization reaction) | Rate of cyclization (%) | 65 | 65 | 65 |
| | Rate of reduction of unsaturated bond (%) | 50 | 50 | 50 |
| | Mw (×10⁴) | 12.9 | 13.0 | 12.7 |
| | Mw/Mn | 1.21 | 1.20 | 1.22 |
| Cyclized polyisoprene (after drying in vacuo) | Mw (×10⁴) | 13.2 | 23.5 | 13.0 |
| | Mw/Mn | 1.21 | 20.2 | 1.22 |
| | Gardner Color Scale | 0.5 | 3.5 | 4.5 |
| | Color tone | Colorless | Yellow | Yellowish red |

(*) 2,6-Di-t-butyl-p-hydroxytoluene

Comparative Example 1 and Comparative Example 2

Polymerization, cyclization and film preparation were carried out in the same manner as in Example 1, except for the termination of the polymerization reaction by 29.4 mmoles of methanol (Comparative Example 1) or 29.4 mmoles of 2,6-di-t-butyl-p-hydroxytoluene (BHT) (Comparative Example 2) in place of the 1% aqueous solution of a special polycarboxylic acid polymer surfactant. Analysis results of the polyisoprene, the cyclized polyisoprene immediately after the cyclization reaction and the cyclized polyisoprene film after drying in vacuo are shown in Table 1.

It is noted from the results shown in Table 1 that in the cyclized polyisoprene obtained from polyisoprene obtained by terminating the polymerization reaction of isoprene by methanol (Comparative Example 1), the molecular weight distribution is remarkably broadened by drying in vacuo and that the obtained film is colored yellow. It is noted that in the cyclized polyisoprene obtained from polyisoprene obtained by terminating the polymerization reaction of isoprene by BHT (Comparative Example 2), though the molecular weight distribution is not broadened by drying in vacuo, the obtained film is remarkably colored.

On the other hand, it is noted that the cyclized polyisoprene obtained from polyisoprene by terminating the polymerization reaction by water has a narrow molecular weight distribution and is free from coloring.

Example 2

To the purified cyclized polyisoprene solution as obtained in Example 1, 2,6-di-t-butyl-4-(4,6-bis(octylthio)-1,3,5-triazin-2-ylamino)phenol was added as an antioxidant in an amount of 1,000 ppm based on the polymer to give a film sample in the same manner as in Example 1. A degradation test was carried out in the air under a condition at 80° C., and any change of the molecular weight distribution was pursued. The results are shown in Table 2. It is noted from the results shown in Table 2 that the conjugated diene polymer cyclized product of the invention has much higher storage stability in comparison with a commercially available diene polymer (polyisoprene; a trade name "LIR50", manufactured by Kuraray Co., Ltd.).

TABLE 2

| | Cyclized polyisoprene | | | Polyisoprene | |
|---|---|---|---|---|---|
| Elapsing time (day) | Mw (×10⁴) | Mw/Mn | Gel amount (%) | Mw (×10⁴) | Mw/Mn |
| Immediately after drying in vacuo | 13.2 | 1.21 | 0 | 6.63 | 1.2 |
| 1 | 13.2 | 1.21 | 0 | 12.5 | 32 |
| 2 | 13.2 | 1.25 | 0 | 23.8 | 152 |
| 7 | 13.5 | 1.35 | 0 | — | — |
| 13 | 13.5 | 1.42 | 0 | — | — |
| 20 | 14.2 | 1.47 | 0 | — | — |

The invention claimed is:

1. A method for producing a cyclized polyisoprene, which comprises:
    adding water to a polyisoprene solution obtained by polymerizing isoprene in a solvent by using an organoalkali metal compound as an initiator, thereby terminating the polymerization, and
    then subjecting the resulting polyisoprene to a cyclization reaction with an organic sulfonic acid compound in said polyisoprene solution,
    wherein said cyclized polyisoprene has a Gardener color scale of not more than 3.0; and
    wherein said polyisoprene is an isoprene homopolymer.

2. A method for producing a cyclized polyisoprene according to claim 1, which is characterized in that the organic sulfonic acid compound is p-toluenesulfonic acid or xylenesulfonic acid.

3. A method for producing a cyclized polyisoprene according to claim 1, which is characterized by making a surfactant present in the polymerization reaction system at the time of adding water.

* * * * *